(12) United States Patent
Yamaki et al.

(10) Patent No.: US 11,474,421 B2
(45) Date of Patent: Oct. 18, 2022

(54) PROJECTOR

(71) Applicant: SEIKO EPSON CORPORATION, Tokyo (JP)

(72) Inventors: Eita Yamaki, Matsumoto (JP); Sei Nakanishi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/213,339

(22) Filed: Mar. 26, 2021

(65) Prior Publication Data
US 2021/0302817 A1    Sep. 30, 2021

(30) Foreign Application Priority Data
Mar. 27, 2020    (JP) ............................. JP2020-057958

(51) Int. Cl.
G03B 21/16    (2006.01)
H04N 9/31    (2006.01)
G03B 21/14    (2006.01)

(52) U.S. Cl.
CPC ........... *G03B 21/16* (2013.01); *H04N 9/3144* (2013.01); *G03B 21/145* (2013.01)

(58) Field of Classification Search
CPC ............................. G03B 21/16; H04N 9/3144
See application file for complete search history.

(56) References Cited

U.S. PATENT DOCUMENTS

| | | | | |
|---|---|---|---|---|
| 2008/0252857 A1* | 10/2008 | Zheng | ............... | G03B 21/16 353/58 |
| 2008/0252858 A1* | 10/2008 | Zheng | ............... | G03B 21/16 353/58 |
| 2012/0257172 A1* | 10/2012 | Shirakura | ............ | G03B 21/16 353/61 |
| 2014/0354958 A1* | 12/2014 | Tsuchitani | ............ | G03B 21/16 353/57 |

FOREIGN PATENT DOCUMENTS

| | | |
|---|---|---|
| JP | 2012-226298 A | 11/2012 |
| JP | 2014-235360 A | 12/2014 |
| JP | 2017-129656 A | 7/2017 |

* cited by examiner

*Primary Examiner* — Bao-Luan Q Le
(74) *Attorney, Agent, or Firm* — Dority & Manning, P.A.

(57) ABSTRACT

A projector that modulates and projects light emitted from a light source includes an exterior housing configuring the exterior of the projector, a cooling target separably attached from the outside of the exterior housing, a cooling fan configured to deliver a cooling gas to the cooling target, and a channel forming member forming a part of a channel in which the cooling gas delivered from the cooling fan flows. In a state in which the cooling target is attached to the projector, the cooling target and the channel forming member form the channel. The cooling gas flows in the channel along the cooling target.

9 Claims, 14 Drawing Sheets

PROJECTOR

The present application is based on, and claims priority from JP Application Serial Number 2020-057958, filed Mar. 27, 2020, the disclosure of which is hereby incorporated by reference herein in its entirety.

BACKGROUND

1. Technical Field

The present disclosure relates to a projector.

2. Related Art

There has been known a projector that causes air having cooled a cooling target on the inside to flow to a functional device such as a wireless device and cools the functional device (see, for example, JP-A-2014-235360 (Patent Literature 1)).

The projector described in Patent Literature 1 includers an exterior housing, a cooling mechanism, and the functional device. The exterior housing includes a cover member projecting to the lower surface side of the exterior housing. The cooling mechanism includes an exhaust fan that discharges air having cooled a light, source device and a power supply device disposed on the inside of the exterior housing to the outside, an exhaust port side duct, and a functional device side duct.

The functional device generates heat at temperature higher than the temperature of the air discharged to the outside of the exterior housing by the exhaust fan. The functional device is provided on the inside of the cover member. A part of the air caused to flow in the exhaust port side duct by the exhaust fan branches and flows to the functional device side duct. The functional device includes a heat sink. The air flowing in the functional device side duct flows to the heat sink, whereby the functional device is cooled. The air having cooled the functional device is discharged to the outside of the projector via a hole section provided in the functional device side duct.

However, in the projector described in Patent Literature 1, the functional device including the heat sink, to which the air flows, is provided on the inside of the cover member projecting to the lower surface side of the exterior housing. Accordingly, the cover member projecting to the lower surface side of the exterior housing tends to be large and the projector tends to be large.

SUMMARY

A projector according to an aspect of the present disclosure is a projector that modulates and projects light emitted from a light source, the projector including: an exterior housing configuring an exterior of the projector; a cooling target separably attached from an outside of the exterior housing; a cooling fan configured to deliver a cooling gas to the cooling target; and a channel forming member forming a channel in which the cooling gas delivered from the cooling fan flows. In a state in which the cooling target is attached to the projector, the cooling target and the channel forming member form the channel. The cooling gas flows in the channel along the cooling target.

BRIEF DESCRIPTION OF THE DRAWINGS

FIG. 3 is a perspective view showing a device cover in the embodiment.

DESCRIPTION OF EXEMPLARY EMBODIMENTS

An embodiment of the present disclosure is explained below with reference to the drawings.

Schematic Configuration of a Projector

Figure 1:
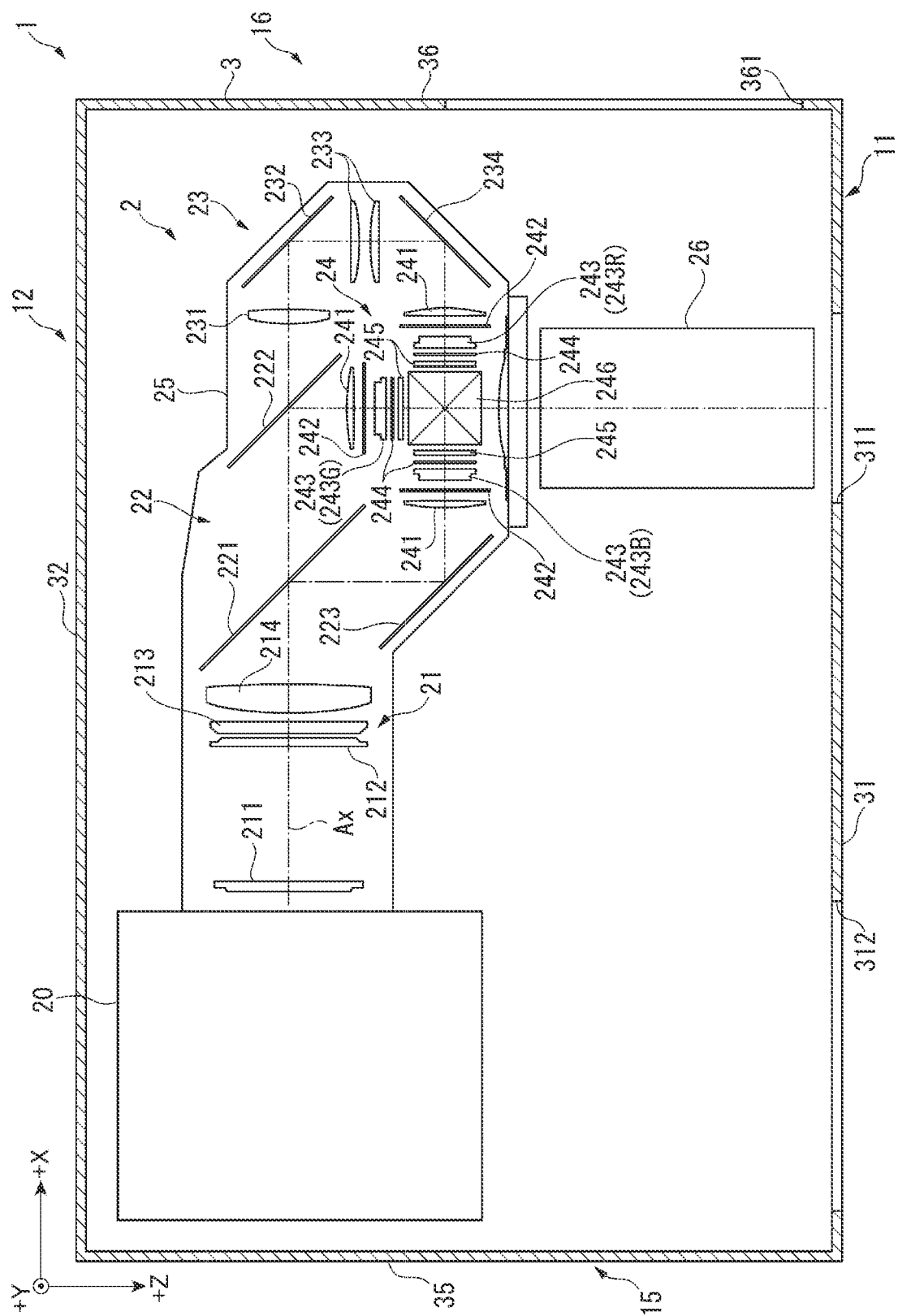
FIG. 1 is a schematic diagram showing the configuration of a projector in an embodiment.

FIG. 1 is a schematic diagram showing the configuration of a projector 1 according to this embodiment.

The projector 1 according to this embodiment modulates light emitted from a light source, forms an image corresponding to image information, and projects the formed image onto a projection surface such as a screen. The projector 1 includes, as shown in FIG. 1, an image projecting device 2 and an exterior housing 3 that houses the image projecting device 2. Although not shown in FIG. 1, the projector 1 includes a cover member 4 attached to the exterior housing 3, a wireless communication device 5 housed in the exterior housing 3, a cooling device 6, and a cooling target. The cover member 4, the wireless communication device 5, and the cooling device 6 are explained in detail below.

Configuration of the Image Projecting Device

The image projecting device 2 forms an image corresponding to image information input from a control device and projects the formed image. The image projecting device 2 includes a light source 20, an equalizing section 21, a color separating section 22, a relay section 23, an image forming section 24, a housing for optical components 25, and a projection optical device 26.

The light source 20 emits light. As the light source 20, a configuration including a solid-state light source such as an LD (Laser Diode) or an LED (Light Emitting Diode) or a configuration including a discharge light source lamp such as an ultrahigh pressure mercury lamp can be illustrated.

The equalizing section 21 equalizes the light emitted from the light source 20. The equalized light illuminates a modulation region of light modulating devices 243 explained below through the color separating section 22 and the relay section 23. The equalizing section 21 includes two lens arrays 211 and 212, a polarization conversion element 213, and a superimposing lens 214.

The color separating section 22 separates the light made incident from the equalizing section 21 into color lights of red, green, and blue.

The color separating section 22 includes two dichroic mirrors 221 and 222 and a reflection mirror 223 that reflects the blue light separated by the dichroic mirror 221.

The relay section 23 is provided in an optical path of the red light longer than optical paths of the other color lights and suppresses a loss of the red light. The relay section 23 includes an incident side lens 231, a relay lens 233, and reflection mirrors 232 and 234. In this embodiment, the relay section 23 is provided on the optical path of the red light. However, not only this, but, for example, color light having an optical path longer than the optical paths of the other color lights may be the blue light and the relay section 23 may be provided on the optical path of the blue light.

The image forming section 24 modulates the red, green, and blue lights made incident thereon and combines the modulated color lights to form an image. The image forming section 24 includes three field lenses 241, three incident-side polarizing plates 242, three light modulating devices 243, three viewing angle compensating plates 244, and three emission-side polarizing plates 245 provided according to the incident color lights and one color combining section 246.

The light modulating devices 243 modulate, according to image information, light emitted from the light source 20. The light modulating devices 243 include a light modulating device 243R for modulating the red light, a light modulating device 243G for modulating the green light, and a light modulating device 243B for modulating the blue light. The light modulating devices 243 are configured by transmission-type liquid crystal panels. A liquid crystal light valve is configured by the incident-side polarizing plates 242, the light modulating devices 243, and the emission-side polarizing plates 245.

The color combining section 246 combines the three color lights modulated by the light modulating devices 243B, 243G, and 243R to form an image and emits the formed image to the projection optical device 26. In this embodiment, the color combining section 246 is configured by a cross dichroic prism. However, not only this, but the color combining section 246 can be configured by, for example, a plurality of dichroic mirrors.

The housing for optical components 25 houses the sections 21 to 24 on the inside. An illumination optical axis Ax, which is an optical axis in design, is set in the image projecting device 2. The housing for optical components 25 holds the sections 21 to 24 in predetermined positions on the illumination optical axis Ax. The light source 20 and the projection optical device 26 are disposed in predetermined positions on the illumination optical axis Ax.

The projection optical device 26 is a projection lens that enlarges an image made incident from the image forming section 24 and projects the image onto the projection surface. That is, the projection optical device 26 projects light modulated by the light modulating devices 243. As the projection optical device 26, a group lens including a plurality of lenses and a tubular lens barrel, on the inside of which the plurality of lenses are housed, can be illustrated.

Exterior Configuration of the Projector

Figure 2:
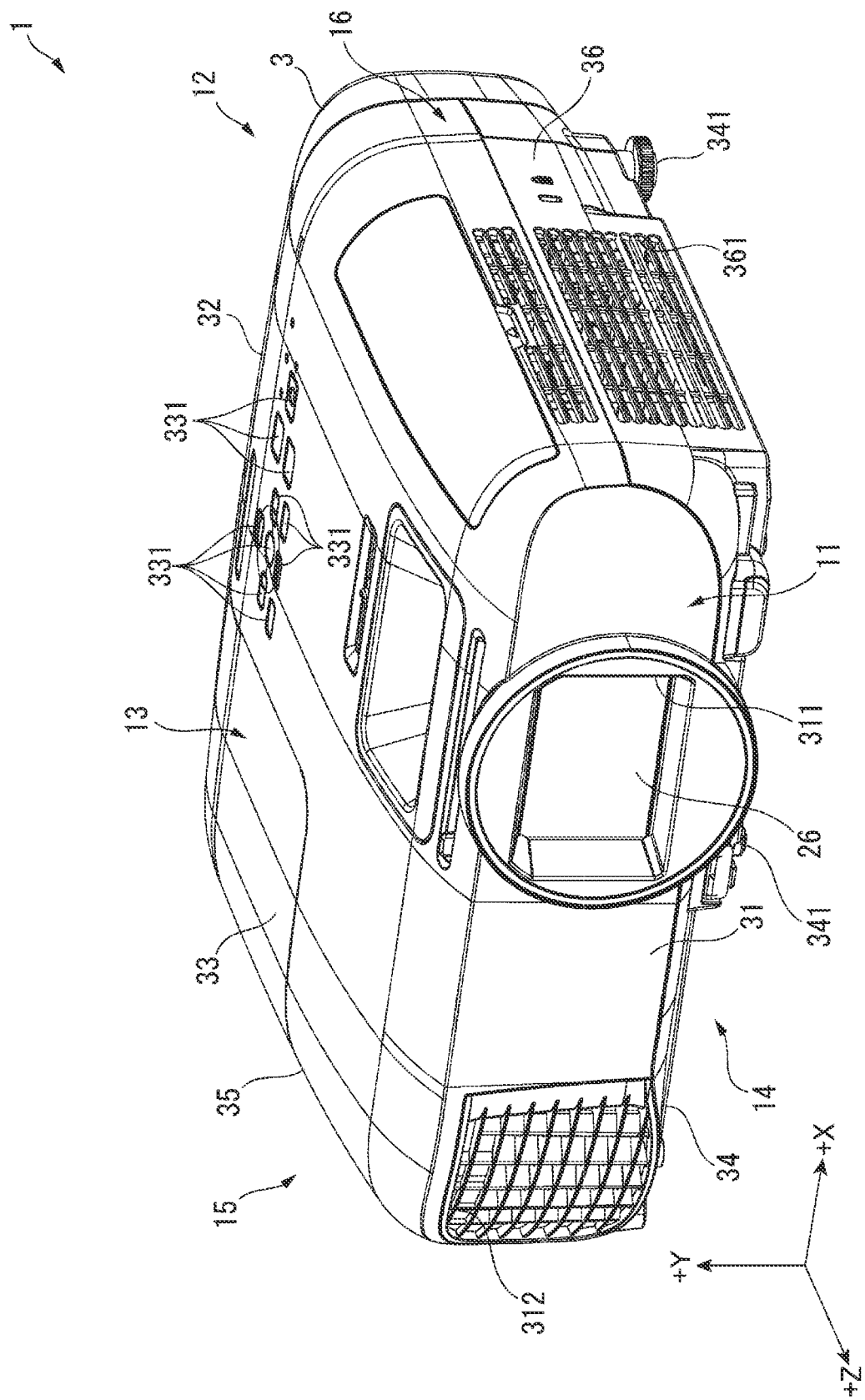
FIG. 2 is a perspective view of the projector in the embodiment viewed from the front side.
Figure 3:
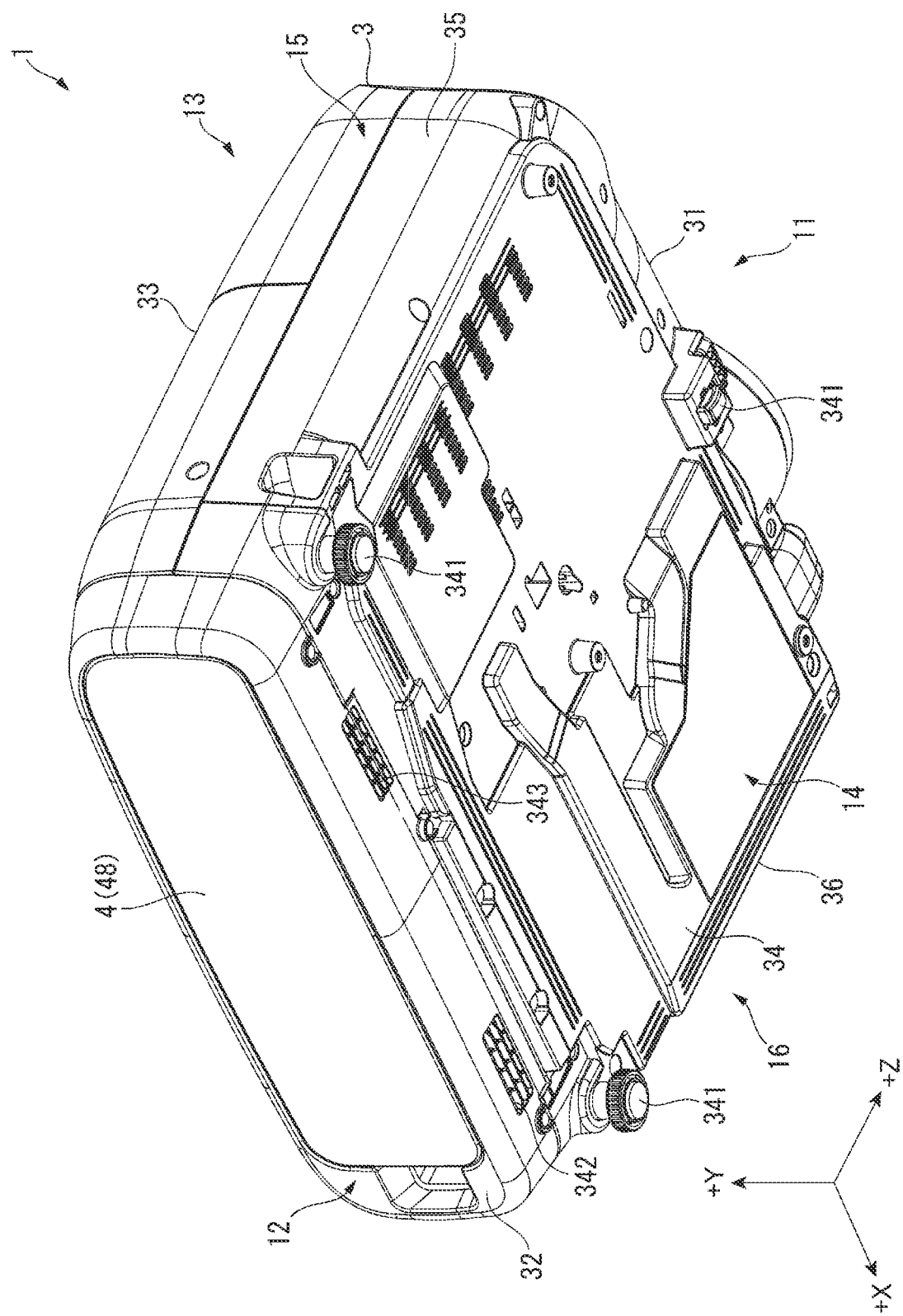
FIG. 3 is a perspective view of the projector in the first embodiment viewed from the rear side.

FIGS. 2 and 3 are perspective views showing the exterior of the projector 1. Specifically, FIG. 2 is a perspective view of the projector 1 viewed from above on the front side. FIG. 3 is a perspective view of the projector 1 viewed from below on the rear side.

The projector 1 includes a front surface 11, a rear surface 12, a top surface 13, a bottom surface 14, a left side surface 15, and a right side surface 16 and is formed in a substantially rectangular parallelepiped shape. The front surface 11 and the rear surface 12 are surfaces on opposite sides from each other. The top surface 13 and the bottom surface 14 are surfaces on opposite sides from each other. The left side surface 15 and the right side surface 16 are surfaces on opposite sides from each other.

In the following explanation, three directions orthogonal to one another are represented as a +X direction, a +Y direction, and a +Z direction. In this embodiment, the +X direction is set to a direction from the left side surface 15 to the right side surface 16, the +Y direction is set to a direction from the bottom surface 14 to the top surface 13, and the +Z direction is set to a direction from the rear surface 12 to the front surface 11. When viewed from the +Y direction, the +Z direction is a direction in which the projection optical device 26 projects light. That is, the front surface 11 is located on an image projection side in the projector 1.

Although not shown, the opposite direction of the +X direction is represented as a −X direction, the opposite direction of the +Y direction is represented as a −Y direction, and the opposite direction of the +Z direction is represented as a −Z direction.

Configuration of the Exterior Housing

The exterior housing 3 configures the exterior of the projector 1 and houses the image projecting device 2 and the wireless communication device 5 explained below on the inside. The exterior housing 3 includes a front surface section 31 configuring the front surface 11, a rear surface section 32 configuring the rear surface 12, a top surface section 33 configuring the top surface 13, a bottom surface section 34 configuring the bottom surface 14, a left side surface section 35 configuring the left side surface 15, and a right side surface section 36 configuring the right side surface 16.

The front surface section 31 is equivalent to a first surface section and the rear surface section 32 is equivalent to a second surface section. The bottom surface section 34 is equivalent to an opposed section opposed to a setting surface on which the projector 1 is set.

As shown in FIG. 2, the front surface section 31 includes a passage port 311 and a discharge port 312.

The passage port 311 is provided on the right side surface section 36 side in the front surface section 31. The passage port 311 is an opening that exposes a part of the projection optical device 26 and through which light projected by the projection optical device 26 passes. The discharge port 312 is located on the left side surface section 35 side in the front surface section 31. The discharge port 312 discharges a cooling gas having cooled a cooling target in the projector 1 to the outside of the exterior housing 3.

The top surface section 33 includes a plurality of operators 331 for operating the projector 1. The plurality of operators 331 are, for example, operation buttons and include an operator for switching ON/OFF of a power supply of the projector 1, an operator for displaying a menu on a projection screen projected by the projector 1, an operator for operating the displayed menu, and an operator for performing geometric correction of a shape of the projection screen.

The right side surface section 36 includes an intake port 361. The intake port 361 introduces air on the outside of the exterior housing 3 into the inside of the exterior housing 3 as a cooling gas.

The bottom surface section 34 connects end portions in the −Y direction in each of the front surface section 31, the rear surface section 32, the left side surface section 35, and the right side surface section 36. The bottom surface section 34 includes a plurality of leg sections 341, an introduction port 342, and an exhaust port 343.

The plurality of leg sections 341 are in contact with the setting surface on which the projector 1 is set. That is, the bottom surface section 34 is a grounding section on which the plurality of leg sections 341 to be set on the setting surface are provided.

The introduction port 342 and the exhaust port 343 are disposed in positions on the rear surface section 32 side (in the −Z direction) in the bottom surface section 34. That is, the introduction port 342 and the exhaust port 343 are disposed in the grounding section. The introduction port. 342 is an opening section for introducing air on the outside of the exterior housing 3 into the inside of a channel forming member 8 explained below provided in the exterior housing 3 as a cooling gas. The exhaust port 343 is an opening section for discharging the cooling gas having cooled a cooling target to the outside of the exterior housing 3 from the channel forming member 8.

The channel forming member 8 is explained in detail below.

Figure 4:
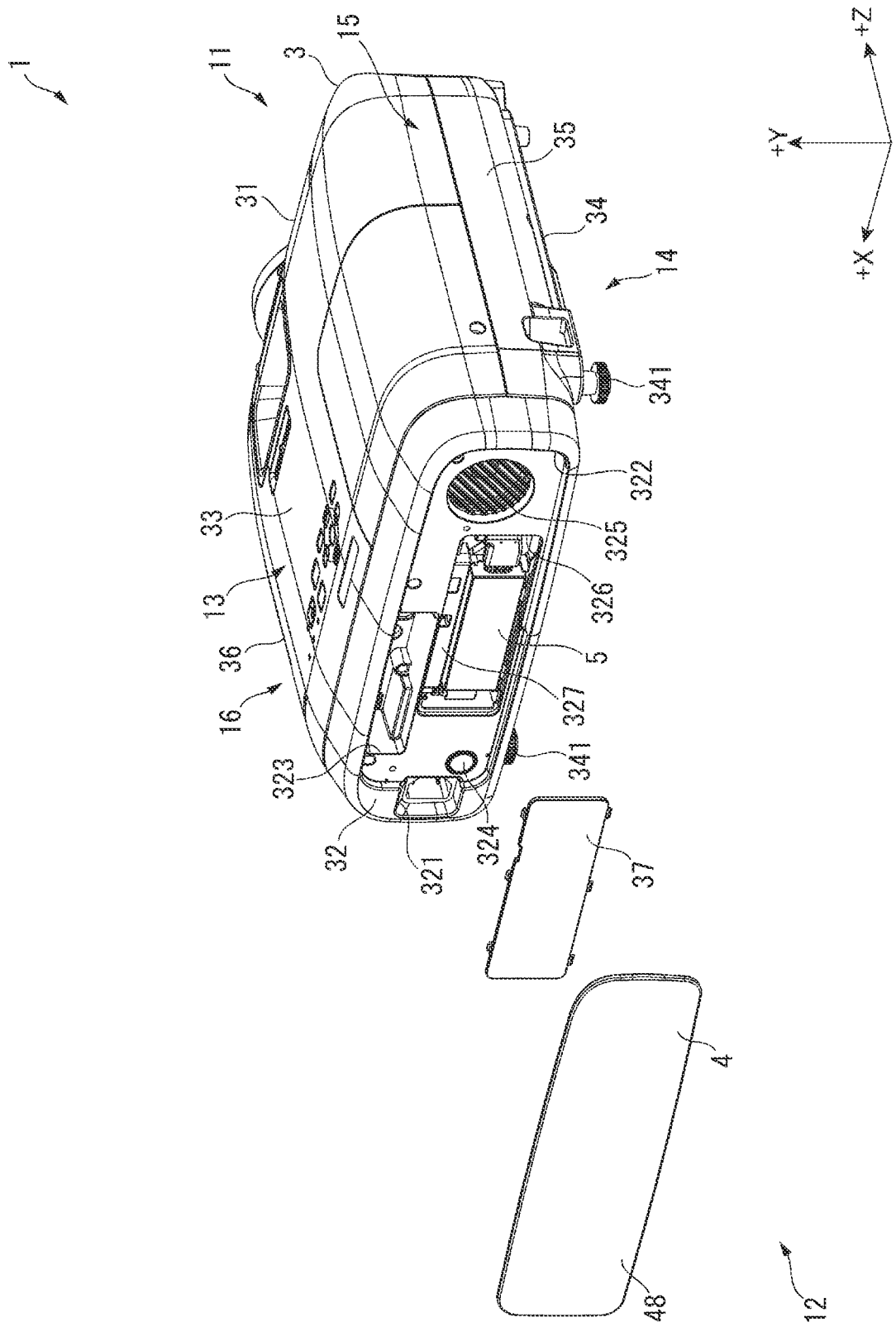
FIG. 4 is an exploded perspective view showing the structure of a rear surface of the projector in the embodiment.
Figure 5:
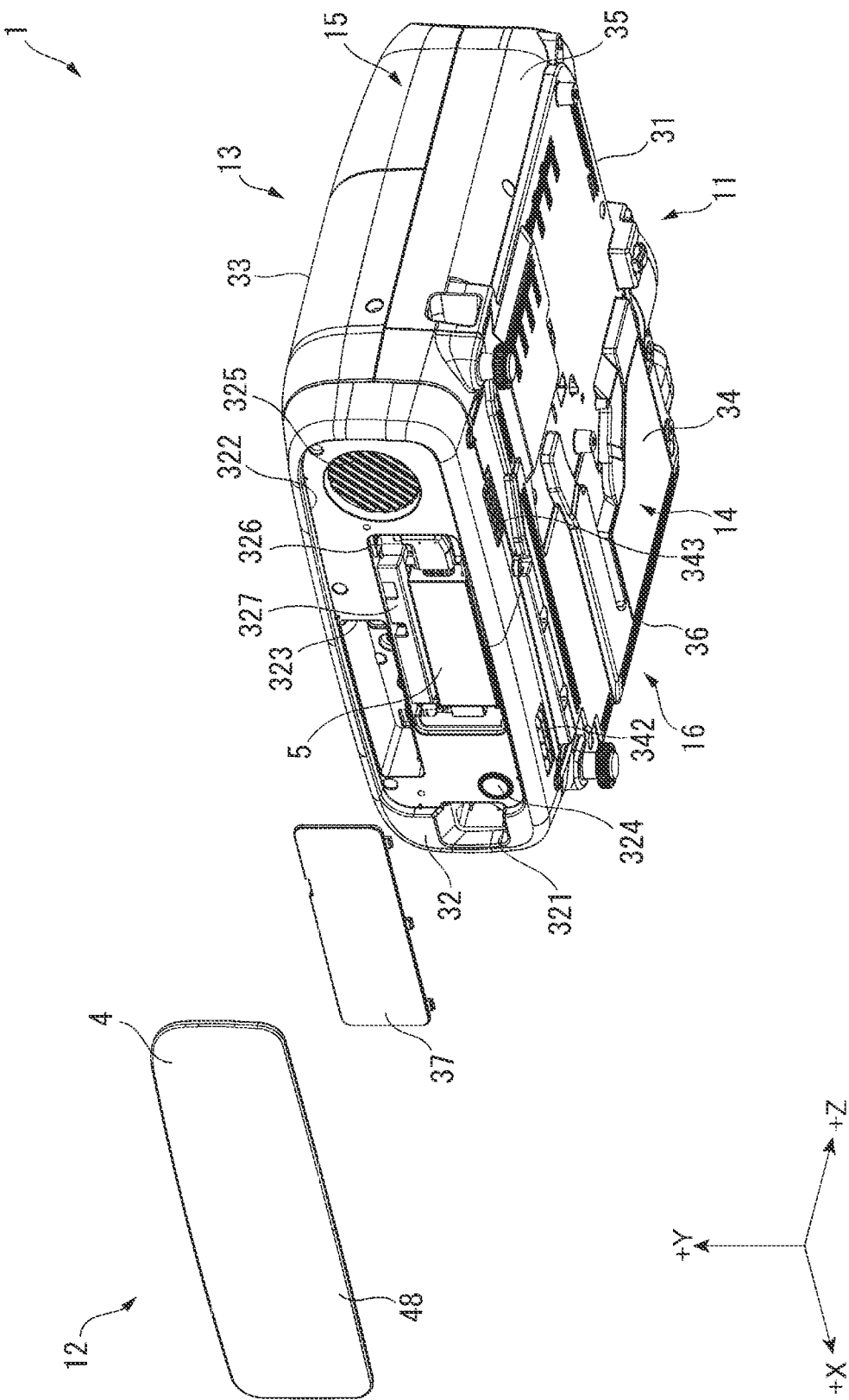
FIG. 5 is an exploded perspective view showing the structure of the rear surface of the projector in the embodiment.

FIGS. 4 and 5 are exploded perspective views showing the structure of the rear surface 12 of the projector 1. That is, FIGS. 4 and 5 are exploded perspective views showing the exterior housing 3, the cover member 4, and a device cover 37.

As shown in FIGS. 4 and 5, the cover member 4 and the wireless communication device 5 are disposed on the rear surface section 32. As explained in detail below, the channel forming member 8 is provided on the rear surface section 32.

A detailed configuration of the rear surface section 32 is explained in detail below.

Configuration of the Cover Member

Figure 6:
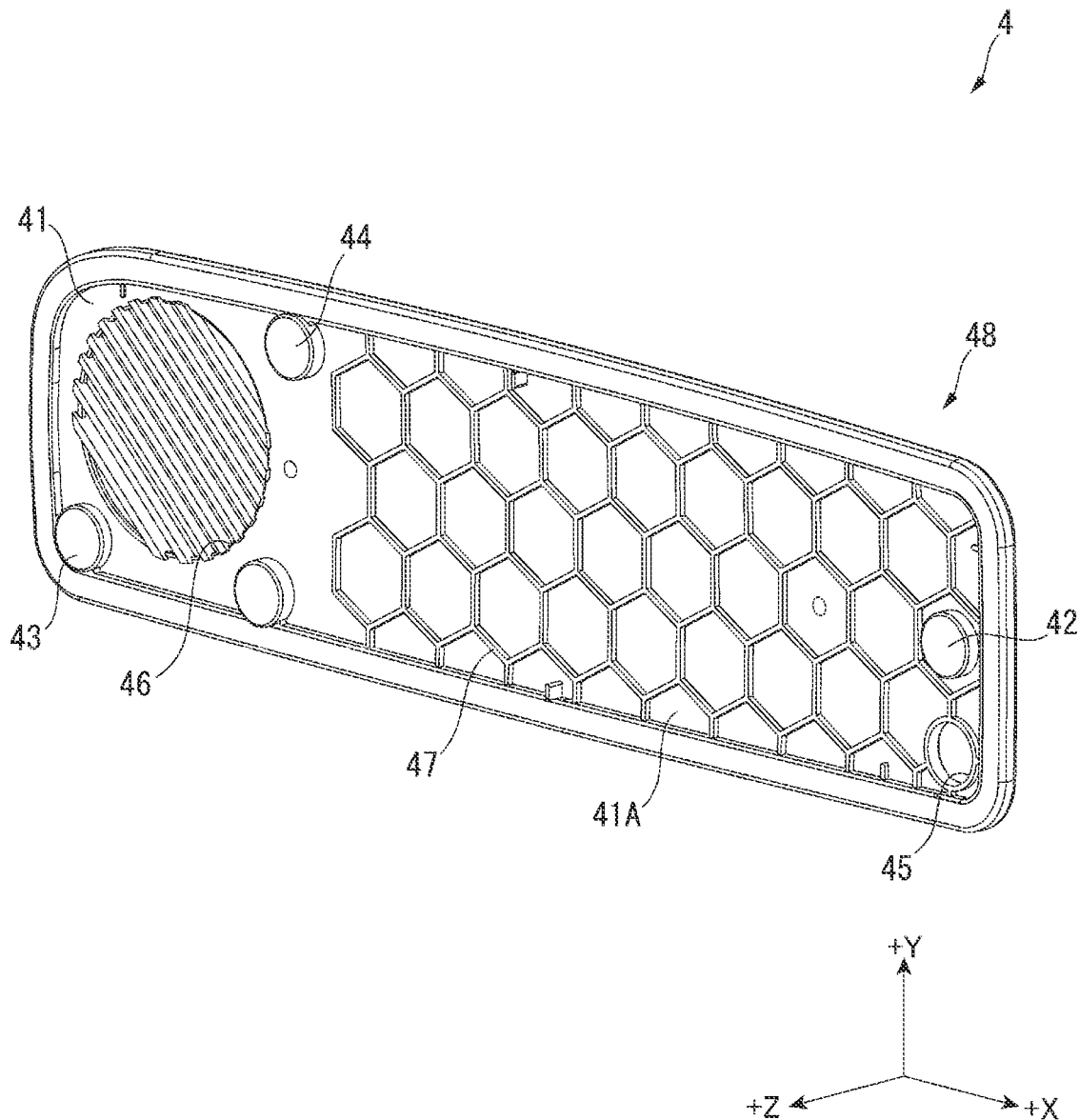
FIG. 6 is a perspective view showing a cover member in the first embodiment.

FIG. 6 is a perspective view of the cover member 4 viewed from the +Z direction. In other words, FIG. 6 is a perspective view of the cover member 4 viewed from the rear surface section 32 side to which the cover member 4 is attached.

The cover member 4 and the rear surface section 32 configure the rear surface 12 of the projector 1. The cover member 4 is a member that is attached to the rear surface section 32, covers, in the −Z direction, the wireless communication device 5 and the like provided on the rear surface section 32, and makes the exterior of the projector 1 satisfactory. The cover member 4 is a substantially rectangular plate-like body fit in a cover disposition section 322 included in the rear surface section 32. The cover member 4 includes, as shown in FIG. 6, a main body section 41 and a covering member 48 covering a surface in the −Z direction in the main body section 41.

The main body section 41 includes three magnets 42, 43, and 44, two opening sections 45 and 46, and a reinforcing rib 47 on a surface 41A in the +Z direction opposed to the rear surface section 32.

The magnet 42 is provided in the center in the +Y direction at the end portion in the +X direction of the surface 41A. The magnet 43 is provided at the corner portion in the −Y direction at the end portion in the −X direction of the surface 41A. The magnet 44 is provided in a position where the magnet 44 and the magnet 43 sandwich the opening section 46 at the end portion in the +Y direction of the surface 41A. The magnets 42 to 44 attract a not-shown magnetic body provided on the rear surface section 32 to thereby attach the cover member 4 to the rear surface section 32. That is, the cover member 4 is separably attached to the rear surface section 32 functioning as the second surface section.

The opening section 45 is provided in a position corresponding to a light receiving section 324 provided on the rear surface section 32 in the main body section 41. Specifically, the opening section 45 is provided at the corner portion in the −Y direction at the end portion in the +X direction of the main body section 41.

The opening section 46 is provided in a position corresponding to a speaker SP (see FIG. 7) provided on the rear surface section 32 in the main body section 41. Specifically, the opening section 46 is provided at the end portion in the −X direction of the main body section 41.

The reinforcing rib 47 is a rib having a configuration obtained by combining a plurality of hexagonal shapes when viewed from the +Z direction. The reinforcing rib 47 increases the strength of the cover member 4.

The covering member 48 prevents the opening sections 45 and 46 from being exposed when the cover member 4 is viewed from the −Z direction.

Since such a cover member 4 is provided on the rear surface section 32, an interface section 323 and the like of the rear surface section 32 are not exposed to the outside. Therefore, the exterior of the projector 1 can be made satisfactory.

Configuration of the Rear Surface Section

Figure 7:
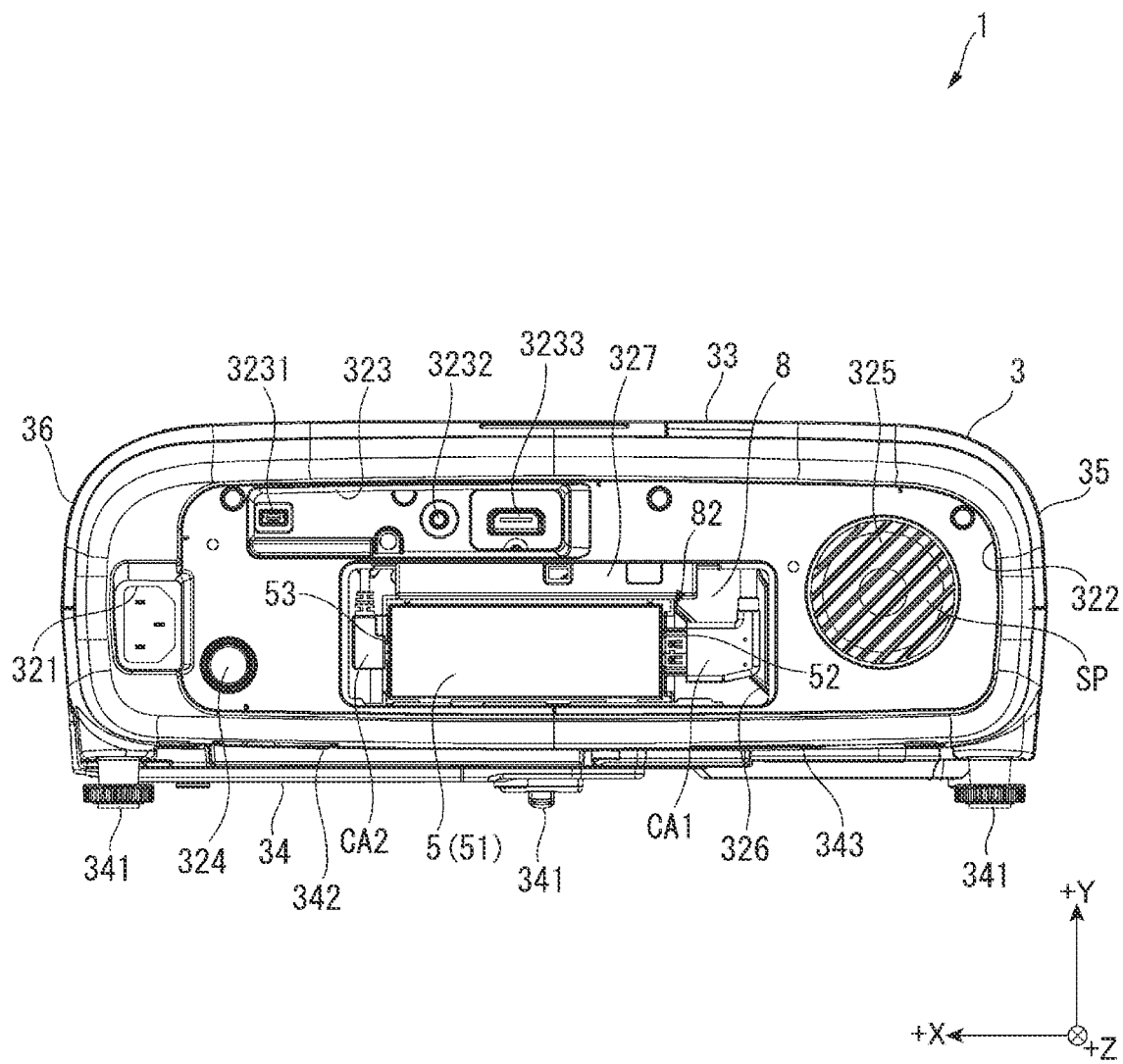
FIG. 7 is a view showing the rear surface from which the cover member in the embodiment is detached.

FIG. 7 is a view of the rear surface 22, from which the cover member 4 is detached, viewed from the −Z direction. That is, FIG. 7 is a view showing the rear surface section 32.

The rear surface section 32 includes, as shown in FIG. 7, an power supply terminal 321, the cover disposition section 322, the interface section 323, the light receiving section 324, a slit 325, an opening section 326, and a cover fixing section 327 and the device cover 37 that closes the opening section 326.

The power supply terminal 321 is provided at the end portion in the +X direction on the rear surface section 32. A power cable to be connected to a socket is inserted into the power supply terminal 321.

The cover disposition section 322 is a part where the cover member 4 is disposed. The cover disposition section 322 is located to deviate to the −X direction side on the rear surface section 32 and is recessed in the +Z direction. Specifically, the cover disposition section 322 is provided in a region excluding a part in the +X direction where the power supply terminal 321 is located on the rear surface section 32.

Although not shown, in the cover disposition section 322, metal plates attracted by the three magnets 42, 43, and 44 are provided in positions corresponding to the magnets 42 to 44 in the cover member 4 by heat caulking. Magnetic fields of the magnets 42 to 44 are cancelled by the metal plates. Magnetic forces of the magnets 42 to 44 are prevented from adversely affecting electronic components such as a fan disposed near the rear surface section 32.

The interface section 323, the light receiving section 324, the slit 325, the opening section 326, and the cover fixing section 327 are disposed on the inner side of the cover disposition section 322. That is, the interface section 323, the light receiving section 324, the slit 325, and the opening section 326 are covered in the −Z direction by the cover member 4 disposed in the cover disposition section 322. The cover fixing section 327 is covered by the device cover 37.

A plurality of terminals are provided in the interface section 323. Specifically, three terminals 3231, 3232, and 3233 are provided in the interface section 323. In this embodiment, the terminal 3231 is a USB (Universal Serial Bus) terminal. The terminal 3232 is an earphone terminal. The terminal 3233 is an HDMI (registered trademark) terminal, which is a video signal input terminal. However, terminals that are provided in the interface section 323 and to which cables to be connected to an external device are connectable can be changed as appropriate.

The light receiving section 324 is provided in a part in the +X direction in the cover disposition section 322. The light receiving section 324 receives an infrared signal transmitted from a not-shown remote controller and outputs the received signal to a not-shown control device.

The slit 325 is provided in a part in the −X direction in the cover disposition section 322. The slit 325 is an opening section through which sound output from the speaker SP passes.

The opening section 326 is provided substantially in the center in the +X direction in the cover disposition section 322. The opening section 326 is an opening section for attaching the wireless communication device 5 to and separating the wireless communication device 5 from the channel, forming member 3 explained below. The opening section 326 is closed by the device cover 37.

The cover fixing section 327 is a part that engages with three locking sections 327 explained below of the device cover 37 and fixes the device cover 37. The cover fixing section 327 is provided in a position in the +Y direction in the opening section 326. The three locking sections 372 are inserted into the cover fixing section 327, whereby the device cover 37 is fixed.

Configuration of the Device Cover

Figure 8:
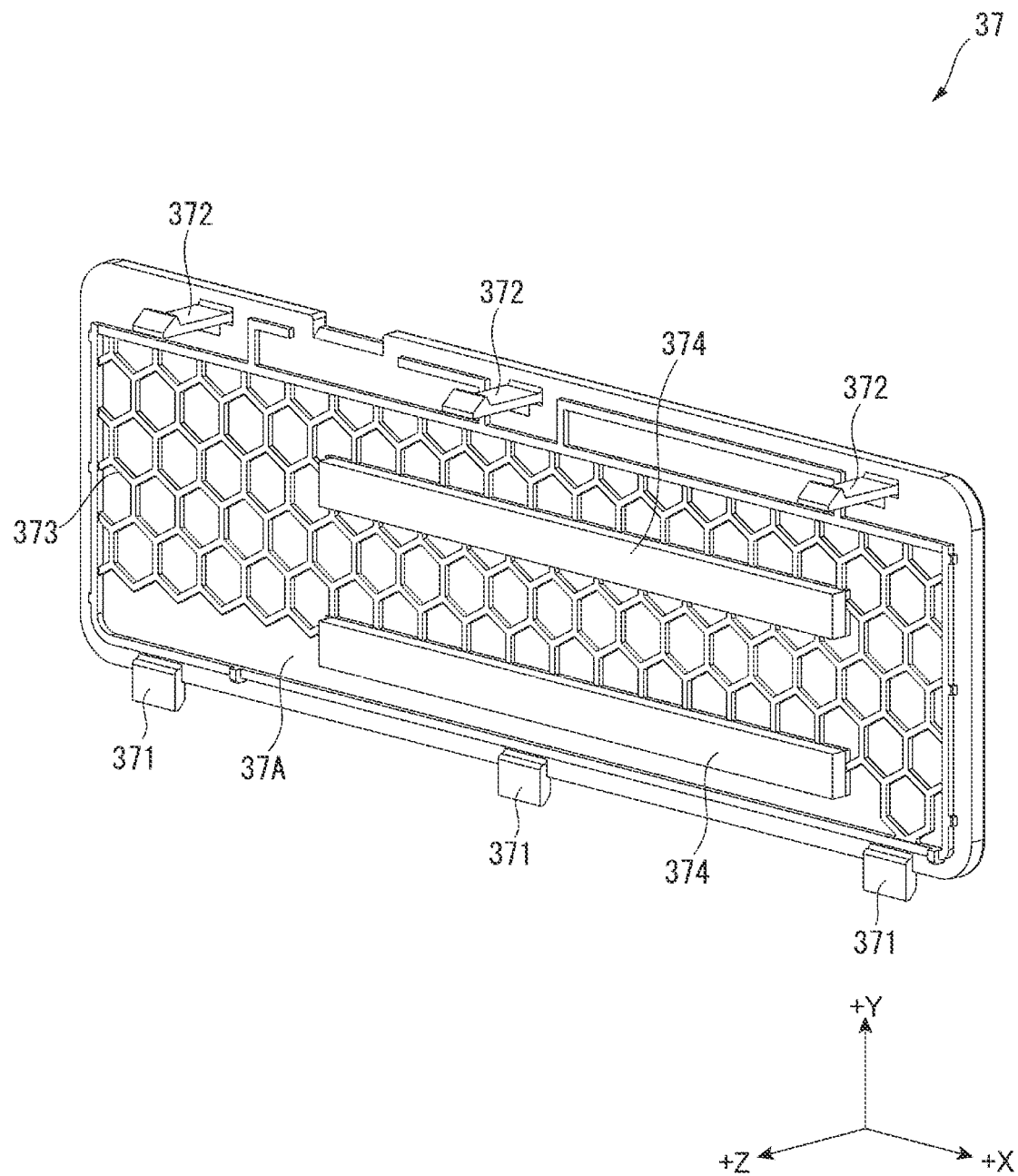

FIG. 3 is a perspective view of the device cover 37 viewed from the +Z direction. In other words, FIG. 8 is a perspective view of the device cover 37 viewed from the rear surface section 32 side to which the device cover 37 is attached.

The device cover 37 is attached to the opening section 326 and configures a part of the rear surface section 32.

The device cover 37 is equivalent to a pressing member. The device cover 37 covers, in the −Z direction, the wireless communication device 5 disposed in the opening section 326 and presses the wireless communication device 5 against the channel forming member 8 located in the +Z direction with respect to the wireless communication device 5 and fixes the wireless communication device 5. The device cover 37 includes, as shown in FIG. 8, three projecting sections 371, three locking sections 372, a reinforcing rib 373, and two elastic sections 374 on a surface 37A in the +Z direction.

The three projecting sections 371 are provided at substantially equal intervals in the +X direction at the end edge in the −Y direction on the surface 37A. Each of the three projecting sections 371 projects in the −Y direction and engages with the end edge in the −Y direction among end edges of the opening section 326.

The three locking sections 372 are provided at substantially equal intervals in the +X direction near the end edge in the +Y direction on the surface 37A. The distal ends of the locking sections 372 are formed in a hook shape. The locking sections 372 engage with not-shown claw sections located in the opening section 326 and lock the device cover 37 in the opening section 326. Consequently, the opening section 326 is closed by the device cover 37.

The reinforcing rib 373 is a rib having a configuration obtained by combining a plurality of hexagonal shapes when viewed from the +Z direction. The reinforcing rib 373 increases the strength of the device cover 37.

The two elastic sections 374 extend along the +X direction and are arrayed along the +Y direction.

When the device cover 37 is locked in the opening section 326, the two elastic sections 374 come into contact with the wireless communication device 5 and press the wireless communication device 5 in the +Z direction toward the channel forming member 8.

The elastic sections 374 can be formed of an elastic member such as rubber or cushion.

Configuration of the Wireless Communication Device

The wireless communication device 5 communicates with a not-shown external device such as a video output device by radio.

Specifically, the wireless communication device 5 receives a video signal from the video output device and outputs the received video signal to the control device. The wireless communication device 5 is separably attached to the rear surface section 32 functioning as the second surface section from the outside of the exterior housing 3. Specifically, the wireless communication device 5 is separably attached to a setting section 82 of the channel forming member 8 explained below from the outside of the exterior housing 3 via the opening section 326.

The wireless communication device 5 includes, as shown in FIG. 7, a package 51, a first connection terminal 52 located on the end face in the −X direction in the package 51, and a second connection terminal 53 located on the end face in the +X direction in the package 51.

The package 51 configures the exterior of the wireless communication device 5 and is formed in a rectangular parallelepiped shape. That is, the wireless communication device 5 is formed in a shape having a longitudinal direction and a lateral direction when viewed from the +Z direction. In this embodiment, the longitudinal direction of the wireless communication device 5 is a direction along a ±X direction and the lateral direction of the wireless communication device 5 is a direction along a ±Y direction. The surface in the +Z direction in the package 51 is exposed in a channel PA (see FIG. 12) explained below and is cooled by a cooling gas flowing in the channel PA. The surface in the −Z direction in the package 51 is pressed by the elastic sections 374.

A video input cable CA1 is connected to the first connection terminal 52. The wireless communication device 5 outputs a received video signal to the video input cable CA1 connected to the first connection terminal 52. In this embodiment, the video input cable CA1 is an HDMI (registered trademark) cable. However, the first connection terminal 52 may be configured to enable other video input cables to be connected to the first connection terminal 52.

A power supply cable CA2 is connected to the second connection terminal 53. The wireless communication device 5 is driven by electric power supplied to the second connection terminal 53. In this embodiment, the power supply cable CA2 is a USB cable. However, the second connection terminal 53 may be configured to enable other power supply cables to be connected to the second connection terminal 53.

When the wireless communication device 5 is attached to the projector 1, the cables CA1 and CA2 are drawn out in the −Z direction from the opening section 326, the drawn-out video input cable CA1 is connected to the first connection terminal 52, and the drawn-out power supply cable CA2 is connected to the second connection terminal 53. In this state, the wireless communication device 5 is set in the setting section 82 explained below (see FIG. 11) and the opening section 326 is closed by the device cover 37, whereby the elastic sections 374 press the wireless communication device 5 in the +Z direction. Consequently, the wireless communication device 5 is attached to the projector 1.

On the other hand, when the wireless communication device 5 is separated from the projector 1, the device cover 37 is detached from the opening section 326 and, thereafter, the wireless communication device 5 connected to the cables CA1 and CA2 is draw out in the −Z direction from the opening section 326. Thereafter, the cables CA1 and CA2 are pulled out from the wireless communication device 5, whereby the wireless communication device 5 is separated from the projector 1.

With such a structure, it is unnecessary to provide, in the exterior housing 3, a space for separating the cables CA1 and CA2 from the wireless communication device 5. Therefore, it is possible to suppress an increase in the size of the exterior housing 3 and an increase in the size of the projector 1.

Configuration of the Cooling Device

Figure 9:
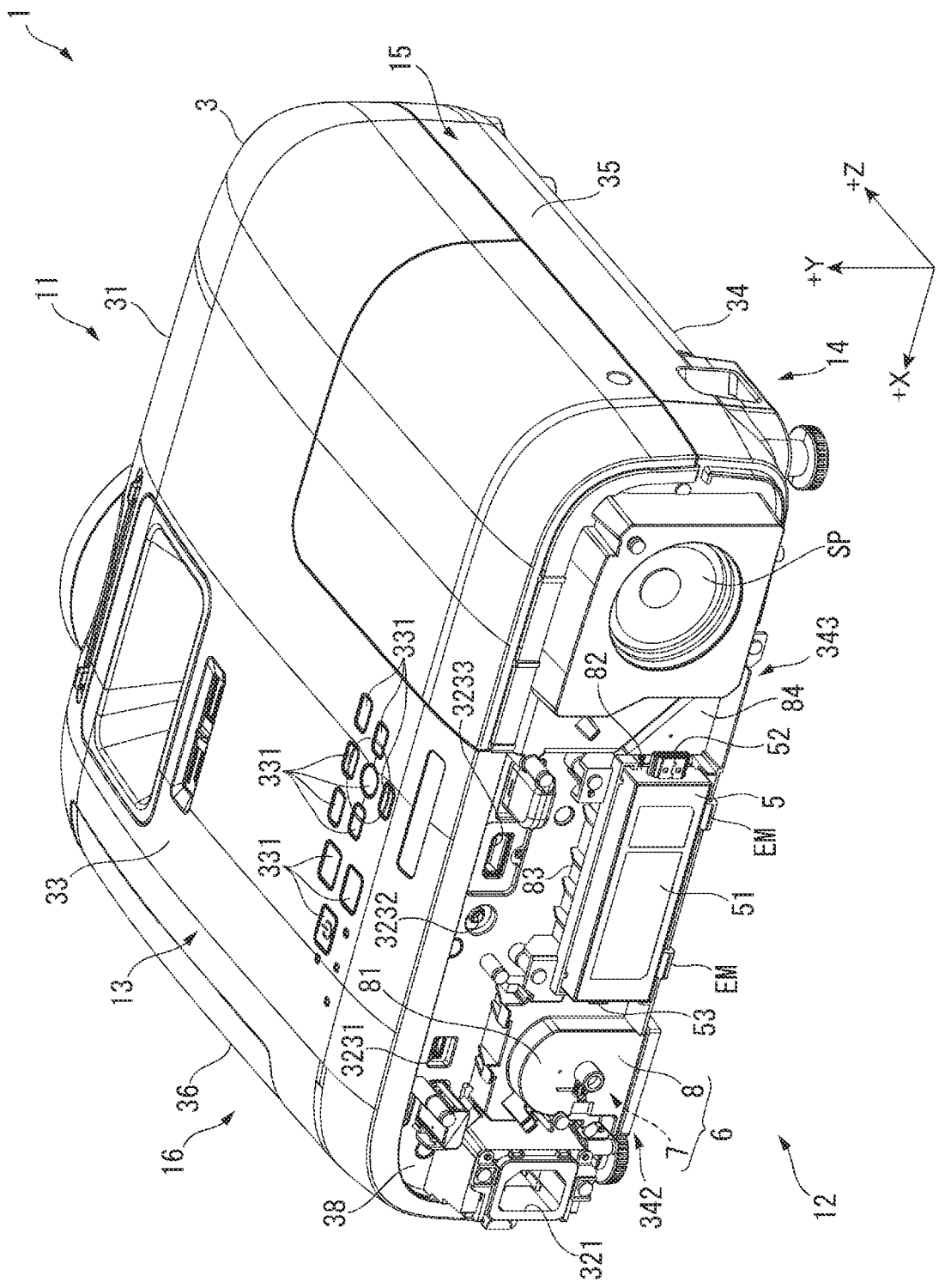
FIG. 9 is a perspective view showing a cooling device attached to an inner housing in the embodiment.

FIG. 9 is a perspective view showing the cooling device 6 attached to an inner housing 38 disposed on the inner side of the exterior housing 3 with respect to the rear surface section 32.

The projector 1 includes, as shown in FIG. 9, the cooling device 6 and the inner housing 38.

The cooling device 6 is disposed on the inside of the exterior housing 3. Specifically, the cooling device 6 is provided in the inner housing 38 disposed further on the inner side of the exterior housing 3 than the rear surface section 32. That is, the cooling device 6 is disposed between the inner housing 38 and the rear surface section 32.

The cooling device 6 cools the wireless communication device 5 as a cooling target. That is, in this embodiment, the wireless communication device 5 is the cooling target. Specifically, the cooling device 6 introduces, as a cooling gas, air on the outside of the exterior housing 3 via the introduction port 342 provided in the bottom surface section 34 and causes the introduced cooling gas to flow to the wireless communication device 5 to cool the wireless communication device 5. The cooling device 6 discharges the cooling gas having cooled the wireless communication device 5 to the outside of the exterior housing 3 via the exhaust port 343 provided in the bottom surface section 34.

Figure 10:
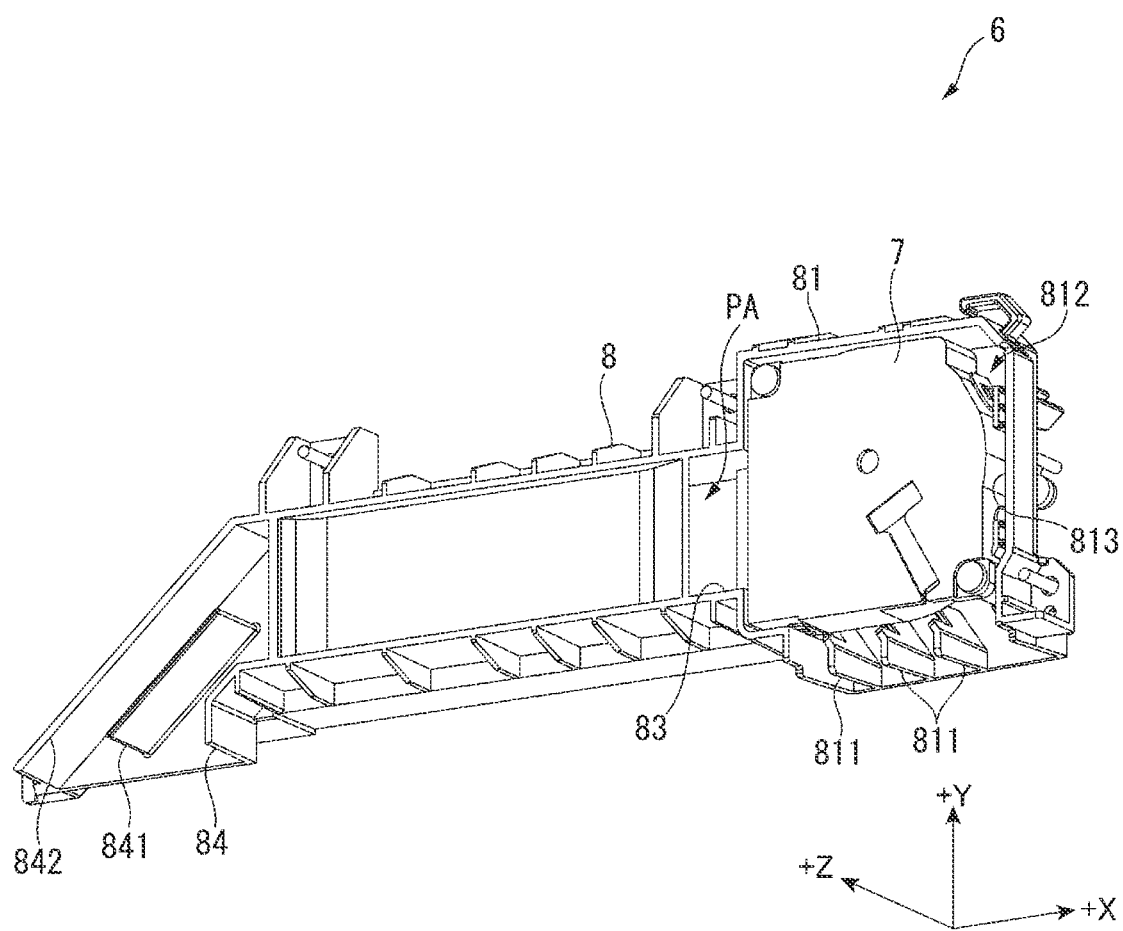
FIG. 10 is a perspective view showing the cooling device in the embodiment.
Figure 11:
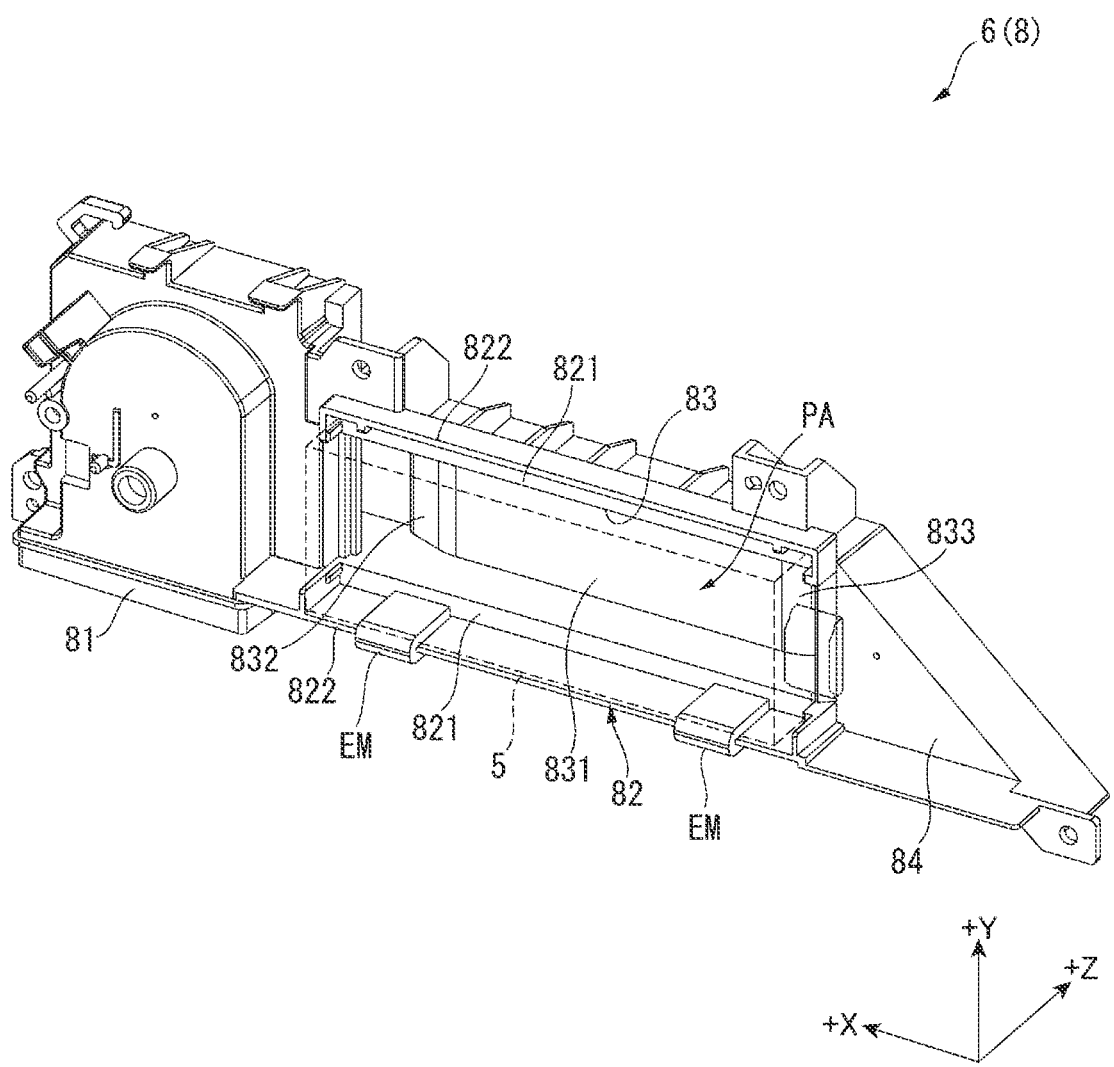
FIG. 11 is a perspective view showing the cooling device in the embodiment.

FIG. 10 is a perspective view of the cooling device 6 viewed from the +Z direction. FIG. 11 is a perspective view of the cooling device 6 viewed from the −Z direction. In FIG. 11, the wireless communication device 5 is indicated by a dotted line.

As shown in FIG. 10, the cooling device 6 includes a cooling fan 7. As shown in FIGS. 9 to 11, the cooling device 6 includes the channel forming member 8.

The cooling fan 7 is disposed in the channel forming member 8 and delivers the cooling gas introduced into the channel forming member 8 to the cooling target. The cooling fan 7 is configured by a sirocco fan.

Configuration of the Channel Forming Member

The channel forming member 8 is configured by the inner housing 38. The channel forming member 3 is combined with the wireless communication device 5 to form a channel in which the cooling gas delivered from the cooling fan 7 flows. The channel forming member 8 includes, as shown in FIGS. 10 and 11, an introducing section 81, a setting section 82, a flowing section 83, and a discharging section 84.

Configuration of the Introducing Section

The introducing section 81 is connected to the introduction port 342 and introduces the cooling gas into the channel forming member 8 via the introduction port 342. That is, the introduction port 342 is connected to the channel forming member 8. The introducing section 81 communicates with the flowing section 83. The introducing section 81 includes a plurality of straightening sections 811, a disposition section 812, and an opening section 813.

The plurality of straightening sections 811 straighten the cooling gas introduced from the introduction port 342. Each of the plurality of straightening sections 811 is inclined to be located further in the −X direction from the introduction port 342 toward the +Y direction. That is, the cooling gas flowing from the introduction port 342 into the introducing section 81 flows in the +Y direction and the −X direction from the introduction port 342.

The disposition section 812 is located in the +Y direction with respect to the plurality of straightening sections 811. The cooling fan 7 is disposed in the disposition section 812. Specifically, the cooling fan 7, which is the sirocco fan, is disposed such that an intake port is opened in the −Z direction and a delivery port is opened in the −X direction in the disposition section 812. When the cooling fan 7 disposed in the disposition section 812 is driven, the air on the outside of the exterior housing 3 is introduced into the introducing section 81 as the cooling gas via the introduction port 342. The cooling fan 7 sucks the cooling gas introduced into the introducing section 81 and delivers the cooling gas in the −X direction. Consequently, the cooling gas flows to the flowing section 83.

The opening section 813 is opened in the +Z direction. The opening section 813 is closed by the inner housing 38.

Configuration of the Setting Section

The setting section 82 is a part where the wireless communication device 5 functioning as the cooling target is set. The device cover 37 presses the wireless communication device 5 against the setting section 82 to fix the wireless communication device 5 to the channel forming member 8. As shown in FIG. 11, the setting section 82 is provided in a concave shape recessed in the +Z direction in a part in the −Z direction in the channel forming member 8 and is exposed in the −Z direction via the opening section 326 provided in the rear surface section 32. The setting section 82 includes a contact surface 821 and a pair of side surface sections 822.

A surface in the +Z direction in the wireless communication device 5 comes into contact with the contact surface 821. The flowing section 83 recessed in the +Z direction is provided substantially in the center of the contact surface 821 in the +Y direction.

The pair of side surface sections 822 is erected in the −Z direction from the contact surface 821. Specifically, the side surface section 822 in the +Y direction of the pair of side surface sections 822 is erected in the −Z direction from the end portion in the +Y direction on the contact surface 821. The side surface section 822 in the −Y direction of the pair of side surface sections 822 is provided at the end portion in the −Y direction on the contact surface 821. In the side surface section 822 in the −Y direction, an elastic member EM that presses the wireless communication device 5 set in the setting section 82 in the +Y direction is provided. The wireless communication device 5 is held in the +Y direction by such a pair of side surface sections 822.

Configuration of the Flowing Section

Figure 12:
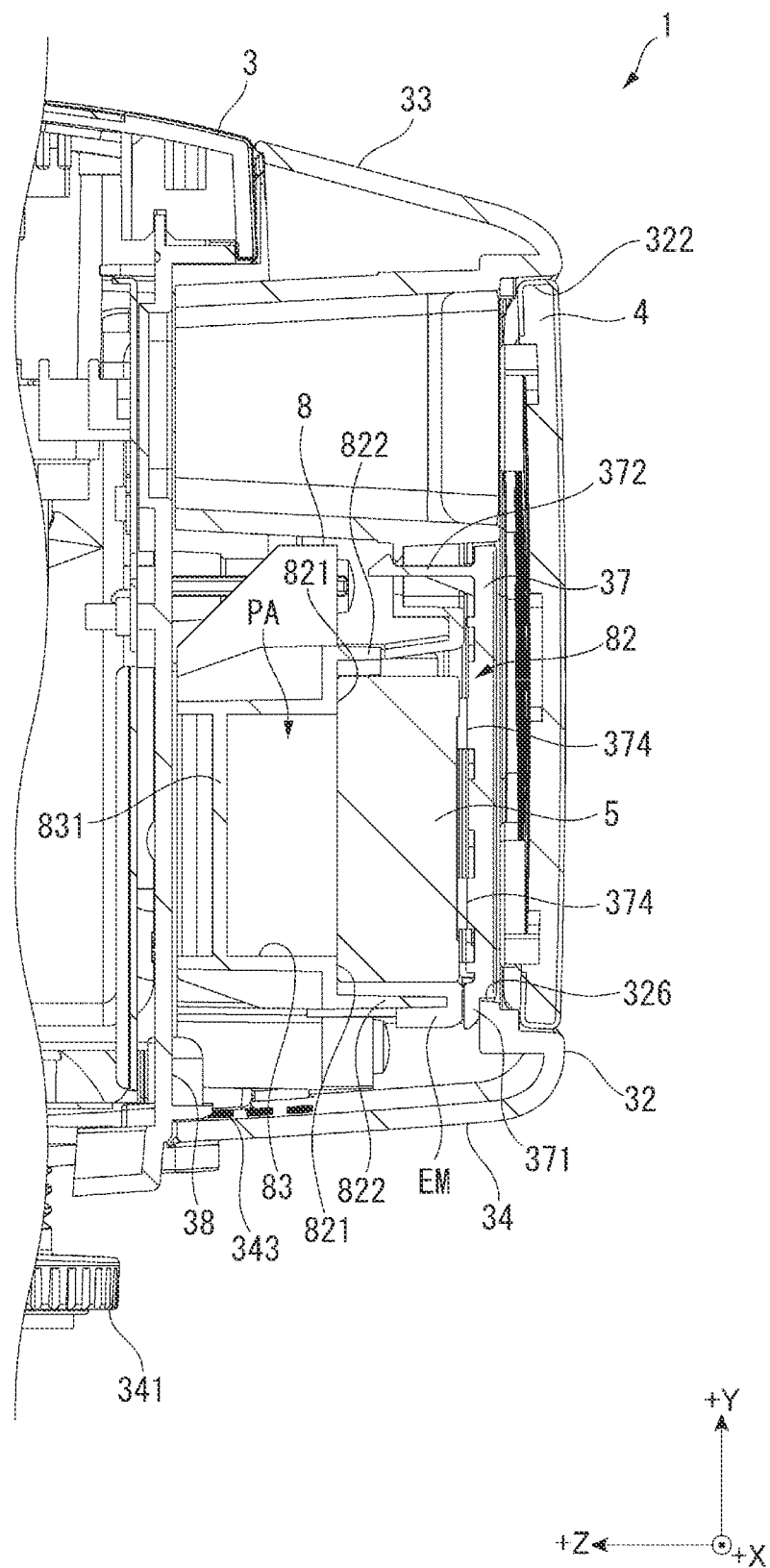
FIG. 12 is a sectional view showing the projector in the embodiment.

FIG. 12 is a view showing a cross section of the projector 1 along a YZ plane in the setting section 82 and the flowing section 83.

The flowing section 83 communicates with the introducing section 81. The cooling gas delivered from the cooling fan 7 disposed in the introducing section 81 flows on the inside of the flowing section 83 in the −X direction. The flowing section 83 is formed in a concave shape recessed in the +Z direction from the contact surface 821 of the setting section 32. The flowing section 83 is opened in the −Z direction. The flowing section 33 is closed in the −Z direction by the wireless communication device 5 set in the setting section 32. Consequently, as shown in FIG. 12, a channel PA in which the cooling gas for cooling the wireless communication device 5 flows is formed. That is, in a state in which the wireless communication device 5 functioning as the cooling target is attached to the projector 1, the wireless communication device 5 and the channel forming member 8 form the channel PA. The channel PA formed by the wireless communication device 5 and the channel forming member 3 functions as a duct in which the cooling gas flows.

Figure 13:
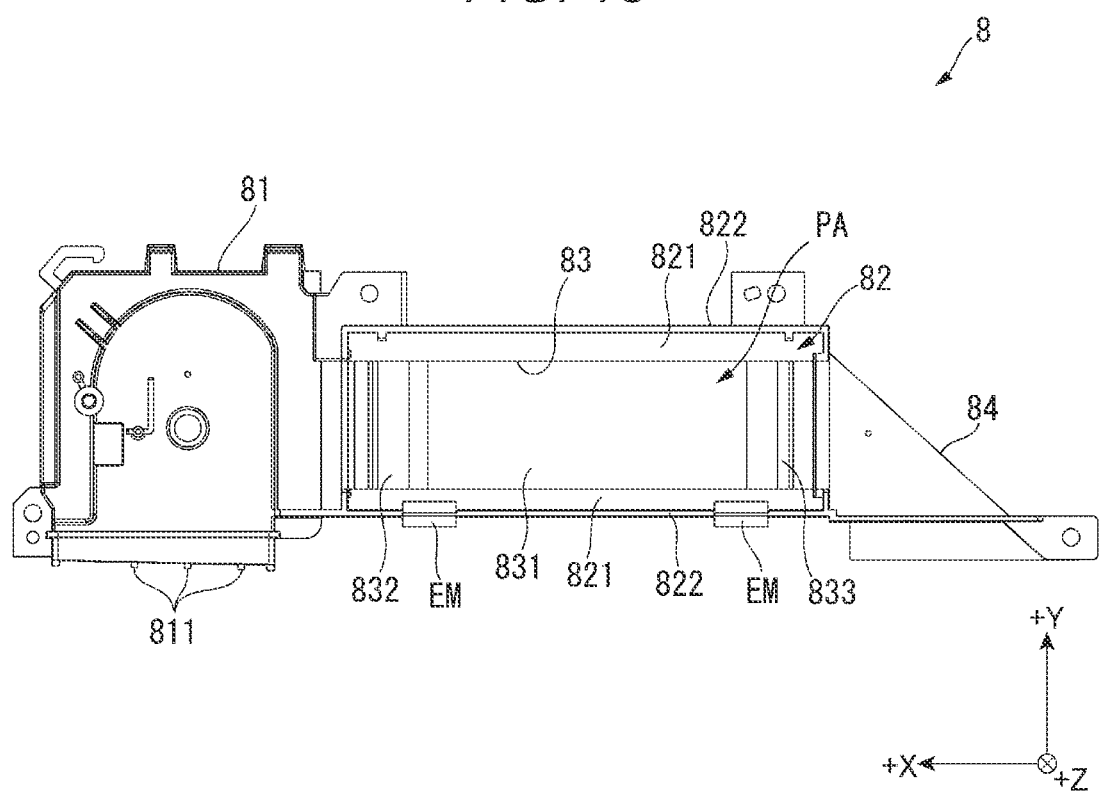
FIG. 13 is a view showing a channel forming member in the embodiment.

FIG. 13 is a side view of the channel forming member 3 viewed from the −Z direction.

As shown in FIGS. 11 and 13, the flowing section 83 includes a wall section 331 equivalent to the bottom of the flowing section 83 formed in the concave shape. The wall section 331 includes an intake-side inclined section 832 located in the +X direction and an exhaust-side inclined section 333 located in the −X direction.

The intake-side inclined section 832 is apart inclined to be located further in the −Z direction toward the −X direction, which is the introducing section 81 side. In other words, the intake-side inclined section 332 is a part inclined in a direction coming closer to the wireless communication device 5 toward a flowing direction of the cooling gas. The intake-side inclined section 832 causes the cooling gas flowing from the introducing section 81 to flow to a part on the wireless communication device 5 side in the channel PA. Consequently, the cooling gas easily flows along a surface exposed in the channel PA in the wireless communication device 5.

The exhaust-side inclined section 833 is a part inclined to be located further in the +Z direction toward the −X direction, which is the discharging section 84 side. In other words, the exhaust-side inclined section 833 is a part inclined in a direction further separating from the wireless communication device 5 toward the flowing direction of the cooling gas. The exhaust-side inclined section 833 allows the cooling gas having flowed in the flowing section 83 to easily flow to the discharging section 84.

Configuration of the Discharging Section

The discharging section 84 shown in FIGS. 10 and 11 communicates with the flowing section 83 and discharges the cooling gas, which has flowed in the flowing section 83 and cooled the wireless communication device 5, to the outside of the exterior housing 3 via the exhaust port 343. The discharging section 84 is inclined to be located further in the −Y direction toward the −X direction from a connection part to the flowing section 83. The end portion in the −Y direction in the discharging section 84 is connected to the exhaust port 343. That is, the exhaust port 343 is connected to the channel forming member 8. The discharging section 84 includes, as shown in FIG. 10, a straightening section 841 and an opening section 842.

The straightening section 841 straightens the cooling gas flowing in the discharging section 84. The straightening section 841 is inclined to be located further in the −Y direction toward the −X direction.

The opening section 842 is opened in the +Z direction. The opening section 842 is closed by the inner housing 38 to which the channel forming member 8 is attached.

Figure 14:
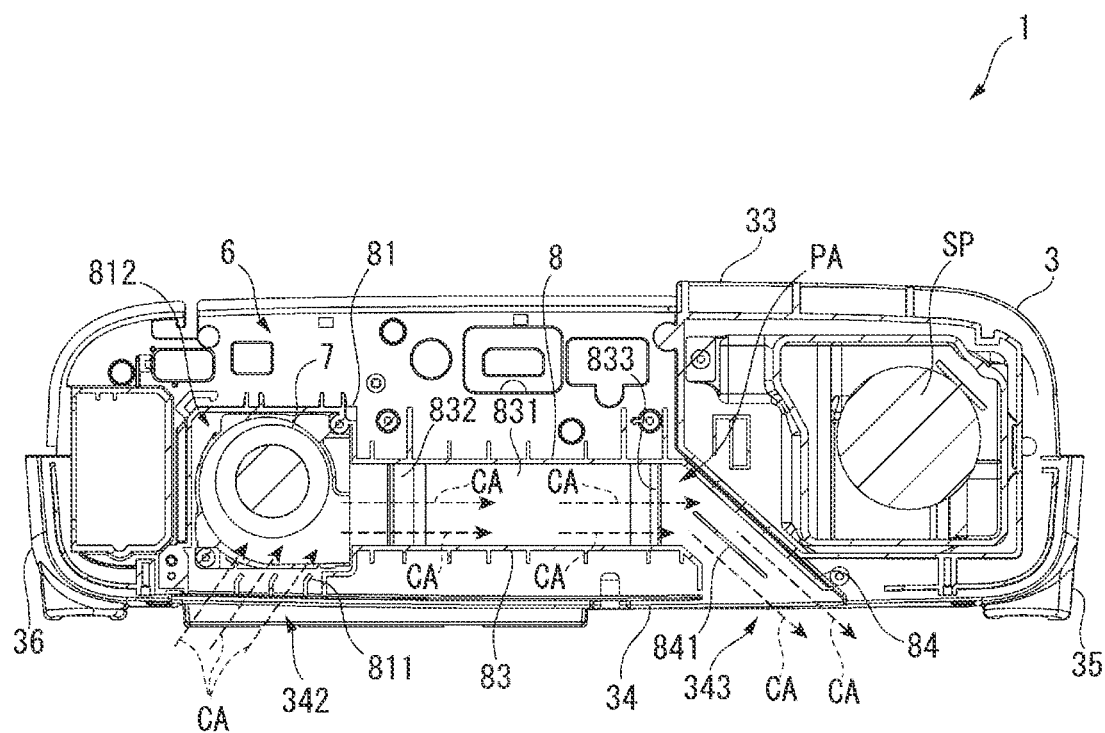
FIG. 14 is a sectional view showing the projector in the embodiment.

Flowing Direction of the Cooling Gas for Cooling the Wireless Communication Device FIG. 14 is a view showing a cross section of the projector 1 along an XY plane in a disposition position of the cooling device 6. That is, FIG. 14 is a view showing a cross section of the cooling device 6 along the XY plane and is a view showing a flowing direction of a cooling gas CA flowing in the cooling device 6. In FIG. 14, the flowing direction of the cooling gas is indicated by dotted line arrows.

When the cooling fan 7 is driven in the cooling device 6 as explained above, as shown in FIG. 14, the air on the outside of the exterior housing 3 is introduced into the introducing section 81 as the cooling gas CA via the introduction port 342 of the bottom surface section 34. The cooling gas CA introduced into the introducing section 81 is sucked by the cooling fan 7 and delivered to the flowing section 83.

On the other hand, the wireless communication device 5 is set in the setting section 82, whereby the channel PA in which the cooling gas CA flows is formed on the inside of the flowing section 83. The cooling gas CA flows in the channel PA along the wireless communication device 5, whereby the wireless communication device 5 is cooled. The wireless communication device 5 is disposed such that the longitudinal direction of the wireless communication device 5 is along the +X direction. A flowing direction of the cooling gas CA flowing in the flowing section 83 is the −X direction along the longitudinal direction of the wireless communication device 5. That is, the cooling fan 7 delivers the cooling gas CA along the longitudinal direction of the wireless communication device 5 and cools the wireless communication device 5.

Consequently, it is possible to, while maintaining a contact area of the wireless communication device 5 and the cooling gas CA, reduce a channel width, which is a dimension, of the channel PA in the +Y direction compared with when the cooling gas CA flows along the lateral direction of the wireless communication device 5.

The cooling gas CA having flowed in the flowing section 33 in this way flows to the discharging section 84.

In the discharging section 84, the cooling gas CA is caused to flow in the −X direction and the −Y direction by the internal shape of the discharging section 84 and the straightening section 841 and discharged to the outside of the projector 1 via the exhaust port 343. In this way, a discharging direction of the cooling gas CA by the discharging section 84 is the −X direction separating from the introduction port 342. Therefore, it is possible to prevent the cooling gas CA discharged from the exhaust port 343 from flowing into the introducing section 81 again via the introduction port 342. Consequently, it is possible to cause the cooling gas CA having relatively low temperature to flow to the wireless communication device 5.

As explained above, the wireless communication device 5 is disposed in the setting section 82 of the channel forming member 8 to form the channel PA. The wireless communication device 5 is cooled by most of the cooling gas delivered from the cooling fan 7. Accordingly, the wireless communication device 5 is more sufficiently cooled than when a part of the cooling gas delivered from the cooling fan 7 is divided and sent to the wireless communication device 5.

Effects in the Embodiment

The projector 1 according to this embodiment explained above can achieve the following effects.

The projector 1 modulates, with the light modulating devices 243, light emitted from the light source 20 and projects the modulated light with the projection optical device 26. The projector 1 includes the exterior housing 3, the wireless communication device 5, the cooling fan 7, and the channel forming member 8.

The exterior housing 3 configures the exterior of the projector 1. The wireless communication device 5 is the cooling target separably attached from the outside of the exterior housing 3. The cooling fan 7 delivers the cooling gas to the wireless communication device 5. The channel forming member 3 forms a part of the channel PA in which the cooling gas delivered from the cooling fan 7 flows. In a state in which the wireless communication device 5 is attached to the projector 1, the wireless communication device 5 and the channel forming member 8 form the channel PA. The cooling gas flows in the channel PA along the wireless communication device 5.

With such a configuration, the wireless communication device 5, which is the cooling target, is cooled by the cooling gas flowing in the channel PA formed by combining the channel forming member 8 and the wireless communication device 5. Consequently, compared with when the channel PA is formed by a duct different from the wireless communication device 5 and when the wireless communication device 5 is disposed in a duct, it is possible to reduce the size of the structure of the cooling device 6 that cools the wireless communication device 5. Therefore, it is possible to suppress an increase in the size of the projector 1 that can cool the wireless communication device 5.

The channel forming member 8 includes the setting section 82 in which the wireless communication device 5 is set and the flowing section 83 recessed from the setting section 82, the cooling gas delivered from the cooling fan 7 flowing in the flowing section 83.

With such a configuration, the flowing section 83 is a part recessed from the setting section 82 in the channel forming member 8. Accordingly, the wireless communication device 5 is set in the setting section 82, whereby it is possible to easily form the channel PA in which the cooling gas for cooling the wireless communication device 5 flows. Besides, it is possible to cause the cooling gas flowing in the flowing section 83 to flow along the wireless communication device 5. Therefore, it is possible to effectively cool the wireless communication device 5 and easily form the channel PA.

The projector 1 includes, in the setting section 82, the device cover 37 as the pressing member that presses the wireless communication device 5.

With such a configuration, it is possible to prevent, with the device cover 37, the wireless communication device 5 from coming off from the setting section 82. Therefore, it is possible to suppress a situation in which the wireless communication device 5 comes off from the setting section 82 and cooling efficiency of the wireless communication device 5 is deteriorated. Besides, it is possible to stably set the wireless communication device 5 in the setting section 82.

The longitudinal direction of the wireless communication device 5 is along the flowing direction of the cooling gas flowing in the channel PA. When the wireless communication device 5 is set in the setting section 82, the longitudinal direction of the wireless communication device 5 is along the +X direction and the flowing direction of the cooling gas is the −X direction.

With such a configuration, it is possible to reduce the width dimension in the channel PA of the cooling gas, that is, the width dimension of the channel PA in the +Y direction, which is the lateral direction of the wireless communication device 5. Therefore, it is possible to reduce the size of the structure of the cooling device 6 that cools the wireless communication device 5. It is possible to suppress an increase in the size of the projector 1 that can cool the wireless communication device 5. Since the width dimension of the channel PA is small, it is easy to collect the cooling gas having cooled the wireless communication device 5. Consequently, it is possible to improve discharge efficiency of the cooling gas.

The projector 1 includes the light modulating devices 243 that modulate light emitted from the light source 20 and the projection optical device 26 that projects the light modulated by the light modulating devices 243. The exterior housing 3 includes the front surface section 31, which is the first surface section, including the opening, which is the passage port 311 through which the light projected by the projection optical device 26 passes, and the rear surface section 32, which is the second surface section, located on the opposite side of the front surface section 31. The wireless communication device 5 is attached to the rear surface section 32.

With such a configuration, it is possible to dispose the wireless communication device 5 in an less conspicuous position. Therefore, it is possible to make the exterior of the projector 1 satisfactory.

The projector 1 includes the cover member 4 separably attached to the rear surface section 32 and covering the wireless communication device 5.

With such a configuration, it is possible to make the wireless communication device 5 less conspicuous. It is possible to make the exterior of the projector 1 satisfactory. The wireless communication device 5 can be attached to or separated from the projector 1 by separating the cover member 4. Therefore, it is possible to improve versatility of the projector 1.

The exterior housing 3 includes the introduction port 342 and the exhaust port 343. The introduction port 342 introduces the air on the outside of the exterior housing 3 into the inside of the channel forming member 8 as the cooling gas. The exhaust port 343 discharges the cooling gas having cooled the wireless communication device 5 to the outside of the exterior housing 3 from the channel forming member 8.

With such a configuration, it is possible to cause the cooling gas having relatively low temperature to flow to the wireless communication device 5. Therefore, it is possible to improve the cooling efficiency of the wireless communication device 5.

The cooling gas having cooled the wireless communication device 5 is discharged via the exhaust port 343. Therefore, the channel PA of the cooling gas flowing in the channel forming member 8 and the exhaust port 343 can be configured as a dedicated channel for cooling the wireless communication device 5. Therefore, it is possible to improve discharge efficiency of the cooling gas having cooled the wireless communication device 5.

The exterior housing 3 includes the bottom surface section 34 functioning as an opposed section opposed to the setting surface on which the projector 1 is set. The introduction port 342 and the exhaust port 343 are disposed in the bottom surface section 34.

With such a configuration, when the projector 1 is set on the setting surface, it is possible to make the introduction port 342 and the exhaust port 343 less conspicuous. Therefore, it is possible to make the exterior of the projector 1 satisfactory.

The channel forming member 8 includes the discharging section 84 that discharges the cooling gas having cooled the wireless communication device 5 to the outside of the exterior housing 3 via the exhaust port 343. A discharging direction of the cooling gas by the discharging section 84 is a direction separating from the introduction port 342.

With such a configuration, it is possible to prevent the cooling gas discharged from the exhaust port 343 from being introduced into the inside of the channel forming member 8 via the introduction port 342 and flowing to the wireless communication device 5 again. Therefore, it is possible to prevent the cooling efficiency of the wireless communication device 5 from being deteriorated as in the case in which the cooling gas having cooled the wireless communication device 5 flows to the wireless communication device 5 again.

Modifications of the Embodiment

The present disclosure is not limited to the embodiment. Modifications, improvements, and the like in a range in which the object of the present disclosure can be achieved are included in the present disclosure.

In the embodiment, the channel forming member 8 includes the setting section 82 in which the wireless communication device 5, which is the cooling target, is set. However, not only this, but the channel forming member 8 does not always need to include the setting section 82 if the channel PA of the cooling gas for cooling the wireless communication device 5 is formed by combining the wireless communication device 5 and the flowing section 83. That is, the setting section in which the wireless communication device 5 is set only has to be provided on the inside of the exterior housing 3 of the projector 1. A component including the setting section is not limited to the channel forming member 8.

In the embodiment, the exterior housing 3 includes the device cover 37 functioning as the pressing member that presses the wireless communication device 5 against the setting section 82 and fixes the wireless communication device 5. However, not only this, but such a pressing member may be absent if the wireless communication device 5 can be stably disposed in the exterior housing 3. The pressing member is not limited to the form of the device cover 37 attached to the opening section 326 that exposes the wireless communication device 5 in the −Z direction. For example, the pressing member may be attached to the channel forming member 8 or may be attached to another component in the exterior housing 3.

In this embodiment, the wireless communication device 5 is disposed such that the longitudinal direction of the wireless communication device 5 is along the flowing direction of the cooling gas for cooling the wireless communication device 5. That is, the cooling gas flows along the longitudinal direction of the wireless communication device 5. However, not only this, but the flowing direction of the cooling gas may be along the lateral direction of the wireless communication device 5.

In the embodiment, the wireless communication device 5 is attached to the rear surface section 32 located on the opposite side of the front surface section 31 functioning as the first surface section in the exterior housing 3. However, not only this, but the wireless communication device 5 may be attached to a surface other than the rear surface section 32 in the exterior housing 3. That is, the wireless communication device 5 may be attached to, for example, any one of the front surface section 31, the rear surface section 32, the left side surface section 35, and the right, side surface section 36 crossing the top surface section 33 on which the plurality of operators 331 for operating the projector 1 are provided.

In the embodiment, the cover member 4 covering the wireless communication device 5 is separably attached to the rear surface section 32. However, not only this, but the cover member 4 may be absent. Even when the cover member 4 is attached, the cover member 4 does not always have to be provided in a position where the cover member 4 covers the wireless communication device 5.

In the embodiment, the exterior housing 3 includes the introduction port 342 connected to the channel forming member 8 and the exhaust port 343 connected to the channel forming member 8. However, not only this, but the channel forming member 8 may not be connected to the introduction port 342 and the exhaust port 343. That is, a channel of the cooling gas for cooling the wireless communication device 5 may not be a dedicated channel for cooling only the wireless communication device 5. For example, the cooling gas flowing to the wireless communication device 5 may be a cooling gas having cooled another cooling target. The cooling gas having cooled the wireless communication device 5 may flow to another cooling target.

In this embodiment, the introduction port 342 for introducing the air on the outside of the exterior housing 3 into the channel forming member 8 as the cooling gas and the exhaust port 343 for discharging, to the outside of the exterior housing 3, the cooling gas having cooled the wireless communication device 5 and discharged from the channel forming member 8 are provided in the bottom surface section 34, which is the opposed section opposed to the setting surface. However, not only this, but at least one of the introduction port 342 and the exhaust port 343 may be provided in a surface other than the bottom surface section 34 in the exterior housing 3. For example, the exterior housing 3 may have a configuration in which an introduction port is provided in a surface other than the bottom surface section 34 and an exhaust port is provided in the bottom surface section 34.

In the embodiment, the cooling gas flowing to the introduction port 342 flows further in the −X direction toward the +Y direction. The cooling gas discharged from the exhaust port 343 flows further in the −X direction, which is the direction separating from the introduction port 342, toward the −Y direction. However, not only this, but a flowing direction of the cooling gas flowing through the introduction port 342 and a flowing direction of the cooling gas flowing through the exhaust port 343 can be changed as appropriate.

In this embodiment, the cooling target of the cooling device 6 is the wireless communication device 5 capable of communicating with the external device. However, not only this, but a component separably attached to a projector can be the cooling target of the present disclosure.

In the embodiment, the projector 1 includes the image projecting device 2 including the optical components having the configuration and the layout shown in FIG. 1. However, not only this, but the configuration and the layout of the optical components included in the image projecting device 2 can be changed as appropriate.

In the embodiment, the projector 1 includes the three light modulating devices 243 (243R, 243G, and 243B). However, not only this, but the present disclosure is also applicable to a projector including two or less or four or more light modulating devices.

In the embodiment, the light modulating devices 243 are the transmission-type liquid crystal panels, light incident surfaces and light emission surfaces of which are different. However, not only this, but reflection-type liquid crystal panels, light incident surfaces and light emission surfaces of which are the same, may be used as light modulating devices. A light modulating device other than liquid crystal such as a light modulating device that makes use of a device including a micromirror, for example, a DMD (Digital Micromirror Device) may be used if the light modulating device is a light modulating device capable of modulating an incident light beam and forming an image corresponding to image information.

Overview of the Present Disclosure

An overview of the present disclosure is appended below.

A projector according to an aspect of the present disclosure is a projector that modulates and projects light emitted from a light source, the projector including: an exterior housing configuring an exterior of the projector; a cooling target separably attached from an outside of the exterior housing; a cooling fan configured to deliver a cooling gas to the cooling target; and a channel forming member forming a channel in which the cooling gas delivered from the cooling fan flows. In a state in which the cooling target is attached to the projector, the cooling target and the channel forming member form the channel. The cooling gas flows in the channel along the cooling target.

With such a configuration, the cooling target is cooled by the cooling gas flowing in the channel formed by combining the channel forming member and the cooling target. Consequently, compared with when the channel in which the cooling gas flows is formed by a duct different from the cooling target and when the cooling target is disposed in a duct, it is possible to reduce the size of a cooling structure that cools the cooling target. Therefore, it is possible to suppress an increase in the size of the projector that can cool the cooling target.

In the aspect, the channel forming member may include: a setting section in which the cooling target is set; and a flowing section recessed from the setting section, the cooling gas delivered from the cooling fan flowing in the flowing section.

With such a configuration, the flowing section is a part recessed from the setting section in the channel forming member. Therefore, when the cooling target is set in the setting section, it is possible to easily form the channel in which the cooling gas for cooling the cooling target flows. Besides, it is possible to cause the cooling gas flowing in the flowing section to flow along the cooling target. Therefore, it is possible to effectively cool the cooling target and easily form the channel.

In the aspect, the projector may include, in the setting section, a pressing member configured to press the cooling target.

With such a configuration, it is possible to prevent, with the pressing member, the cooling target from coming off from the setting section. Therefore, it is possible to suppress a situation in which the cooling target comes off from the setting section and cooling efficiency of the cooling target is deteriorated. Besides, it is possible to stably set the cooling target in the setting section.

In the aspect, a longitudinal direction of the cooling target may be along a flowing direction of the cooling gas.

With such a configuration, it is possible to reduce the width dimension in the channel of the cooling gas, that is, the width dimension of the channel in the lateral direction of the cooling target. Therefore, it is possible to reduce the size of the cooling structure that cools the cooling target. It is possible to suppress an increase in the size of the projector that can cool the cooling target. Since the width dimension of the channel is small, it is easy to collect the cooling gas having cooled the cooling target. Consequently, it is possible to improve discharge efficiency of the cooling gas.

In the aspect, the projector may further include: a light modulating device configured to modulate the light emitted from the light source; and a projection optical device configured to project the light modulated by the light modulating device. The exterior housing may include: a first surface section including an opening through which the light projected by the projection optical device passes; and a second surface section located on an opposite side of the first surface section. The cooling target may be attached to the second surface section.

With such a configuration, it is possible to dispose the cooling target in an less conspicuous position. Therefore, it is possible to make the exterior of the projector satisfactory.

In the aspect, the projector may further include a cover member separably attached to the second surface section and covering the cooling target.

With such a configuration, it is possible to make the cooling target less conspicuous. It is possible to make the exterior of the projector satisfactory. The cooling target can be attached to or separated from the projector by separating the cover member. Therefore, it is possible to improve versatility of the projector.

In the aspect, the exterior housing may include: an introduction port for introducing air on the outside of the exterior housing into an inside of the channel forming member as the cooling gas; and an exhaust port for discharging the cooling gas having cooled the cooling target to the outside of the exterior housing from the channel forming member.

With such a configuration, it is possible to cause the cooling gas having relatively low temperature to flow to the cooling target. Therefore, it is possible to improve cooling efficiency of the cooling target.

The cooling gas having cooled the cooling target is discharged via the exhaust port. Therefore, a channel of the cooling gas flowing through the introduction port, the channel forming member, and the exhaust port can be configured as a dedicated channel for cooling the cooling target. Therefore, it is possible to improve discharge efficiency of the cooling gas having cooled the cooling target.

In the aspect, the exterior housing may include an opposed section opposed to a setting surface on which the projector is set, and the introduction port and the exhaust port may be disposed in the opposed section.

With such a configuration, when the projector is set on the setting surface, it is possible to make the introduction port and the exhaust port less conspicuous. Therefore, it is possible to make the exterior of the projector satisfactory.

In the aspect, the channel forming member may include a discharging section configured to discharge, via the exhaust port, the cooling gas having cooled the cooling target to the outside of the exterior housing, and a discharging direction of the cooling gas by the discharging section may be a direction separating from the introduction port.

With such a configuration, it is possible to prevent the cooling gas discharged from the exhaust port from being introduced into the inside of the channel forming member via the introduction port and flowing to the cooling target again. Therefore, it is possible to prevent the cooling efficiency of the cooling target from being deteriorated as in the case in which the cooling gas having cooled the cooling target flows to the cooling target again.

In the aspect, the cooling target may be a wireless communication device that communicates with an external device.

With such a configuration, it is possible to suppress an increase in the size of the projector that can cool the wireless communication device.

What is claimed is:

1. A projector that modulates and projects light emitted from a light source, the projector comprising:
    a display panel configured to modulate the light emitted from the light source;
    one or more lenses configured to project the light modulated by the display panel;
    an exterior housing configuring an exterior of the projector, the exterior housing including;
    a first surface defining an opening through which the light projected by the one or more lenses passes, and
    a second surface located on a side of the exterior housing different than the first surface and having an opening;
    an inner housing disposed on the inner side than the second surface of the exterior housing;
    a wireless communication device separably attached from an outside of the exterior housing on the second surface;
    and
    a cooling device configured to cool the wireless communication device and to be attached to the inner housing, the cooling device including:
        an introduction port introducing air on the outside of the exterior housing as the cooling gas,
        an exhaust port discharging the cooling gas having cooled the wireless communication device, to the outside of the exterior housing,
        a cooling fan delivering the cooling gas to the wireless communication device, and
        a channel body configured to be provided on the inner housing along the second surface and to be combined with the wireless communication device,
    wherein
    the channel body includes
        an introduction section connected to the introduction port and introducing the cooling gas from the introduction port,
        a disposition section disposing the cooling fan and introducing the cooling gas to the cooling fan from the introduction section,
        a setting section setting the wireless communication device and exposed via the opening of the second surface,
        a flowing section forming a channel with an outer surface of the wireless communication device when the wireless communication device is attached to the setting section, and communicated with the introduction port via the setting section that the cooling gas is delivered from the cooling fan to the channel, and
        a discharging section discharging the cooling gas that is cooled the wireless communication device, to the exhaust port from the channel.

2. The projector according to claim 1, wherein
the channel comprises a duct having one end thereof inclined in a direction approaching the wireless communication device.

3. The projector according to claim 1, wherein
the flowing section has a concave recess which is recessed against from the outer surface of the wireless communication device when the wireless communication device is attached to the setting section.

4. The projector according to claim 3, wherein the projector includes a device cover configured to close the opening of the second surface by pressing the wireless communication device.

5. The projector according to claim 4, further comprising a cover separably attached to the second surface and covering the device cover.

6. The projector according to claim 1, wherein a longitudinal direction of the wireless communication device is along a flowing direction of the cooling gas.

7. The projector according to claim 1,
wherein
the second surface is located on an opposite side of the first surface.

8. The projector according to claim 1, wherein
the second surface is a surface opposed to the first surface,
the exterior housing includes a third surface across from the first surface and the second surface, and
the introduction port and the exhaust port are disposed in the third surface.

9. The projector according to claim 1, wherein the wireless communication device communicates with an external device.

* * * * *